United States Patent [19]

Becker

[11] 4,415,682

[45] Nov. 15, 1983

[54] STABLE AQUEOUS EPOXIDE RESIN DISPERSION, A PROCESS FOR ITS PREPARATION, AND ITS USE

[75] Inventor: Wilhelm Becker, Hamburg, Fed. Rep. of Germany

[73] Assignee: Hoechst Aktiengesellschaft, Frankfurt am Main, Fed. Rep. of Germany

[21] Appl. No.: 445,028

[22] Filed: Nov. 29, 1982

[30] Foreign Application Priority Data

Dec. 1, 1981 [DE] Fed. Rep. of Germany ....... 3147458

[51] Int. Cl.$^3$ ..................... C08G 59/02; C08G 59/18; C08G 59/20
[52] U.S. Cl. ................................... 523/403; 523/402; 523/404
[58] Field of Search ....................... 523/402, 403, 404

[56] References Cited

U.S. PATENT DOCUMENTS 4,116,900  9/1978  Belanger ........................... 523/404
4,128,515  12/1978  Tobias et al. ..................... 523/402

FOREIGN PATENT DOCUMENTS 46-29625  8/1971  Japan ................................. 523/402
1244424   9/1971  United Kingdom ............. 523/403
1268780   3/1972  United Kingdom ............. 523/402

*Primary Examiner*—Ronald W. Griffin
*Attorney, Agent, or Firm*—Hammond & Littell, Weissenberger and Muserlian

[57] ABSTRACT

Low-solvent, stable, aqueous dispersion of (a) 35 to 65% by weight of epoxide resin having a mean epoxide equivalent weight of about 250 to about 5,000 and (b) a non-ionic dispersant in the form of a polyalkylene glycol derivative, which contains as component (b) 2 to 20% by weight of dispersant comprising condensation products of polyalkylene glycols having molecular weights of 200 to 20,000 and polyglycidyl ethers of polyhydric phenols having an epoxide equivalent weight of 100 to 2,000 in an equivalent ratio of OH to epoxide groups of 1:(0.85 to 1.5), (c) 0.2 to 20% by weight of organic solvent having a boiling point below 160° C. and (d) 35 to 60% by weight of water, where the proportions always total 100% by weight, the particle size is on average less than 1 μm and the total solids content of the dispersion is 10 to 80% by weight, and a process for its preparation, and its use for preparing shaped articles, in particular surface coatings.

19 Claims, No Drawings

STABLE AQUEOUS EPOXIDE RESIN DISPERSION, A PROCESS FOR ITS PREPARATION, AND ITS USE

It is known to prepare synthetic resins by emulsion polymerization and to produce stable aqueous dispersions of these resins by adding the solid resin and a suitable dispersant with stirring to water. However, in the case of condensates such as epoxide resins, which are difficult to prepare by emulsion condensation, aqueous dispersions must be prepared by dispersing the solid resin in water. Such dispersions are generally very unstable and solids settle out even within a short time. They generally also have poor film-forming properties. These disadvantages, namely low stability of the dispersion and poor film properties, are mainly caused by the large particle size of the resin. In conventionally formed dispersions of solid resins, the particle size of the resin is of the order of magnitude of 50 micron or greater.

The preparation of coating compositions based on polyepoxide dispersions is disclosed in a publication, according to which a hot-hardening one-component coating composition is produced by grinding and dispersing a solid, brittle polyepoxide, a solid, brittle epoxide hardener, for example a polyanhydride, and, if appropriate, an epoxide hardening accelerator in a liquid which is not a solvent for the various components. Aliphatic hydrocarbons are preferred. This process produces epoxide dispersions which, however, are not aqueous and which harbor the dangers inherent in using hydrocarbon solvents.

It has also been disclosed how to prepare stable aqueous, organic solvent-free dispersions of relatively low molecular weight (200 to 4,000, preferably 240 to 1,300) epoxide resins with particle sizes of less than about 10 micron using anionic, non-ionic, but preferably cationic dispersants. In this method, the epoxide resin is heated to give a melt, which is mixed with water and the dispersant, and the mixture is then passed through a colloid mill. This process can only disperse those epoxide resins of the specified molecular weight which melt below 100° C., the boiling point of water. This severe limitation has the disadvantage that it excludes numerous useful high molecular weight epoxide resin systems. In addition, dispersing at the boiling temperature of water produces still relatively large particles which settle out rapidly.

In another process for preparing aqueous dispersions of solid epoxide resins, a first stream consisting of water and certain dispersants and a second stream containing molten solid resin or a solution of a solid resin in certain organic solvents are passed into a high-shear mixer and mixed there under high shear to the specified degree of dispersion, and, if appropriate, the organic solvent is removed by vacuum distillation. The dispersants used in this process are in particular materials derived from cellulose, such as guar gum and also polyvinyl alcohols, if appropriate with alkyl ether, arylalkyl ether, phenoxy, amide or amine groups, or also nonylphenoxypoly(ethyleneoxy) ethanols. The particle size of these dispersions which can be prepared in this way is still fairly high, the stability of the dispersions is inadequate, and the properties of coatings and paints prepared therefrom are unsatisfactory.

According to a further publication, poly(ethylene oxide) esters of fatty acids are used as dispersants to prepare stable, solvent-free, aqueous epoxide resin dispersions. Even with the aid of a colloid mill, a minimum particle size of 1 μm is obtained, which is not adequate for prolonged stability of the dispersions.

The preparation of epoxide solid resins which can also be obtained directly in the form of an aqueous dispersion has also already been described. The dispersants used in this method are block polymers of ethylene oxide and polypropylene glycol or polymers of polyethylene glycols having a molecular weight of 2,000 to 20,000 and polyglycidyl ethers of polyphenols having a molecular weight of 300 to 2,000 in a molecular ratio of 2:1 to 6:5. This process also produces only dispersions which lack stability and have a particle size of 1 to 3 μm.

A low-solvent, stable, aqueous dispersion has now been found which consists of (a) 35 to 65% by weight of epoxide resin having a mean epoxide equivalent weight of about 250 to about 5,000 and (b) a non-ionic dispersant in the form of a polyalkylene glycol derivative, which contains as component (b) 2 to 20, preferably 7 to 15%, by weight of dispersant comprising condensation products of polyalkylene glycols having molecular weights of 200 to 20,000, preferably 2,000 to 10,000, and polyglycidyl ethers of polyhydric phenols having an epoxide equivalent weight of 100 to 2,000, preferably 150 to 450, in an equivalent ratio of OH to epoxide groups of 1: (0.85 to 1.5), preferably 1:(1 to 1.25), (c) 0.2 to 20% by weight of organic solvent having a boiling point below 160° C. and (d) 35 to 60% by weight of water, where the proportions always total 100% by weight, the particle size is on average less than 1 μm and the total solids content of the dispersion is 10 to 80, preferably 30 to 60% by weight.

Surprisingly, the dispersions according to the invention have the advantage that they have a very small particle size.

It is possible to modify the dispersion by varying the organic solvent content. It the solvent content is, for example, 0.2 to 5% by weight, the system obtained is usually a dispersion within the narrower meaning of the word, i.e. the solid particles are finely divided in the liquid. If, however, the solvent content is increased to 5 to 20% by weight, the result is as a rule an emulsion, i.e. component (a) and/or (b) are dissolved in the solvent and a system is obtained in which the solvent with the substances dissolved therein is finely divided in the aqueous phase.

Dispersions according to the invention have a further advantage in that under ambient conditions they can be stored for a relatively long time, for example up to 12 months, without the epoxide resin particles caking to one another.

Possible solid epoxide resins (a) are all known polyglycidyl ethers having more than one terminal glycidyl group

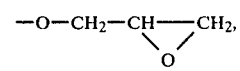

in particular those which have a mean epoxide equivalent weight between 300 and 1,000. They are conveniently derived from polyhydric, preferably dihydric, phenols and epihalogenohydrins, for example epichlorohydrin, and optionally carry substituents, such as chlorine, hydroxyl groups, ether groups and the like. Examples of suitable phenols are 2,2-bis-(3-bromo-4-hydroxyphenyl)-propane, 2,2-bis-(3,5-dichloro-4-hydroxyphenyl)-propane, 2,2-bis-(3-chloro-4-hydroxyphenyl)-propane, bis-(hydroxyphenyl)-methane, bis-(4-hydroxyphenyl)-sulfone, bis-(4-hydroxyphenyl)sulfide, resorcinol and hydroquinone, preferably 2,2-bis-(4-hydroxyphenyl)-propane.

Examples of suitable dispersants (b) are condensation products of polyalkylene glycols with polyglycidyl ethers having an epoxide equivalent weight of 100 to 2,000 and of the type mentioned under (a), suitable polyalkylene glycols being copolymers of ethylene oxide and propylene oxide, or polyethylene, polypropylene or polybutylene glycols, in each case singly or mixed, preferably polyethylene glycols.

The dispersants can be obtained, for example, by condensing the glycols mentioned with the glycidyl ethers in the presence of specific catalysts at an elevated temperature, in general at 50 to 200, preferably 90° to 150° C. Examples of suitable catalysts for this purpose are boron trifluoride and its complexes, for example with water, phosphoric acid, acetic acid (1:1 and 1:2), methanol, diethyl ether, tetrahydrofuran, phenol, tricresyl phosphate, ethylene glycol monoethyl ether (molecular weight: 200), polyethylene glycol (molecular weight: 200), dimethyl sulfoxide, di-n-butyl ether, di-n-hexyl ether and succinic acid, and also with amines, such as with monoethylamine, benzylamine or the like. However, differently based Lewis acids, such as $SnCl_4$, are also suitable. $BF_3$ diethyl ether and $BF_3$ acetic acid are preferably used. The amount of catalyst is generally 0.1 to 5, preferably 0.2 to 1, % by weight, relative to the reaction mixture. To facilitate metering, the catalyst can be diluted in a solvent inert to the complex, such as diethyl ether, a glycol or cyclic ether or the like, preferably dioxane, up to 0.5 to 10, preferably 1 to 3, % by weight.

Organic solvents (c), present according to the invention, must satisfy several prerequisites. In particular, they must dissolve the epoxide resin. Secondly, they should be readily removable from the aqueous system by means of vacuum distillation. They are thus distinguished by corresponding volatility, relatively low boiling point (below 160° C.) and by suitable azeotropic behavior in water. On the other hand, water solubility or water miscibility are not conditions for the suitability of the organic solvent. In some cases, a water-soluble solvent, such as acetone, can even be less suitable than a solvent with lower water solubility, such as methyl ethyl ketone, or an almost water-insoluble solvent, such as toluene. Mixtures of organic solvents can also be used.

Examples of suitable solvents are ketones, such as methyl ethyl ketone, methyl amyl ketone, diethyl ketone, acetone, methyl isopropyl ketone and cyclohexanone; ethers, such as tetrahydrofuran, 1,2-dimethoxyethane and 1,2-diethoxyethane; esters, such as ethyl acetate and n-butyl acetate; alcohols, such as isobutanol, n-butanol, isopropanol and n-propanol, amyl alcohols; aromatic hydrocarbons, such as benzene, toluene and xylene; and halogenated aromatic hydrocarbons, such as chlorobenzene. Xylene, toluene, n-butanol and isobutanol or their mixtures, in particular a toluene/isobutanol mixture, are preferred.

The invention also relates to a process for preparing the abovementioned dispersions, wherein a 40 to 95, preferably 60 to 90, % by weight solution of epoxide resin (a) in an organic solvent (c) is dispersed together with a 10 to 90, preferably 20 to 40, % by weight aqueous solution of dispersant (b) to give a finely divided oil-in-water dispersion, which is then diluted with further water to a solids content of 10 to 80, preferably 30 to 60, % by weight, and the dispersant content, relative to the solid epoxide resin, is 2 to 20% by weight. The solvent added as part of the solution of epoxide resin (a) can be largely or partially removed, for example by means of distillation under reduced pressure.

The distillation to separate off the solvent is advantageously carried out at a temperature of at most 50, preferably between 30° and 40° C. and under a pressure of preferably 13 to 133, in particular up to about 27, mbar.

The dispersing is advantageously effected using a high-speed blade stirrer, a colloid mill, a homogenizer or any other high-shear high-speed mixer, for example a dissolver.

The invention also relates to the use of dispersions according to the invention in combination with hardening agents to prepare water-dilutable or aqueous systems of cold- and hot-hardening compositions—for example as an additive to plastic cements—and coatings, in particular surface coatings. Such systems can also contain further condensation, polymerization and/or addition resins, for example those based on hydroxyalkylacrylic esters, hydroxyalkyds, polyesters, epoxide resins and the like. The proportion of these additional resins can be adjusted in such a way, for example, that the total solids content of the mixture is about 10 to 80, preferably 30 to 60, % by weight. By adding such resins the properties of the products prepared from the dispersions can be affected in a desirable manner. Thus, for example, it is possible that the presence of acrylate resins improves the yellowing resistance and the addition of alkyd resins improves the elasticity of surface coatings prepared therefrom.

When used according to the invention, the dispersion according to the invention is advantageously used in combination with amine hardeners, preferably amine cold hardeners, in an equivalent ratio of epoxide equivalent to amine hydrogen equivalent of 1:(0.75 to 1.5) or in combination with adidic hardeners. In addition to the known amine cold hardeners, such as trimethylhexamethylenediamine, isophoronediamine, xylylenediamine, polyethylenepolyamines and polyproylenepolyamines, which can also be present in the form of adducts of polyglycidyl ethers, as polyamidoamines of dimerized fatty acids or as Mannich bases, via reaction with phenols and formaldehyde, water-soluble polyoxypropylenediamines having molecular weights of 190 to 2,000 and hardeners which are readily dispersible in water, of the type described in German Auslegeschrift No. 2,332,177 and European Patent Application No. 605, i.e. for example modified amine adducts, are particularly highly suitable. To complete in-depth hardening the coatings can also be heated to 50°–120° C. for 30 to 120 minutes.

In a further embodiment of the invention it is possible to add acidic hardeners, such as polycarboxylic acids or their anhydrides, to dispersions according to the invention without added phenolic and/or amine resins, according to their epoxide equivalent, for example in a ratio of 1 COOH group per epoxide group.

Suitable acidic hardeners are water-soluble polycarboxylic acids, for example cyclopentanetetracarboxylic acid, in particular butanetetracarboxylic acids, such as cyclobutanetetracarboxylic acid, preferably 1,2,3,4-butanetetracarboxylic acid, also aconitic acid, citric acid or anhydrides of these acids provided they exist, or acidic esters of these acids with polyhydric alcohols having 2 to 12, preferably 2 to 6, carbon atoms, such as neopentylglycol, glycerol, trimethylolethane, trimethylolpropane, alkanediols and oligomers thereof which may contain one or more ether bridges, such as ethylene glycol, propane diol and butane diols, where in each case the esters have at least 3 free COOH groups.

It is also possible to use acidic esters having 3 or more COOH groups of pyromellitic acid, trimellitic acid, phthalic acid, endomethylenetetrahydrophthalic acid, endomethylenehexahydrophthalic acid, maleic acid, fumaric acid or anhydrides thereof, provided they exist, with polyhydric alcohols, for example those mentioned above, as polycarboxylic acid hardeners, provided these acidic esters have adequate water solubility or water dilutability. Care must be taken here that dicarboxylic acids are reacted with at least trihydric alcohols, or that dihydric alcohols are reacted with at least tricarboxylic acids, to obtain an adequate number of COOH groups in the acidic ester.

5 to 50% by weight, relative to solids, of an amino and/or phenolic resin, as additional hardeners, and sufficient water to give a total solids content of 10 to 80% by weight can also be added to aqueous dispersions according to the invention.

Examples of amine resins suitable for this purpose are commercially available—preferably etherified—urea-formaldehyde or melamine-formaldehyde resins, for example a hexamethoxymethylmelamine material having a largely monomeric structure or corresponding resins of oligomeric or polymeric type. If appropriate, acidic catalysts, such as p-toluenesulfonic acid, cyclohexanesulfamic acid, acidic butyl phosphate and phosphoric acid can also be added to the mixtures containing phenolic and/or amine resin, to increase the rate of the hardening reaction, so that films or surface coatings are produced which harden at a relatively low temperature or in a relatively short time. The amount of these acidic catalysts is, for example up to 2% by weight, relative to total solids content.

Examples which may be mentioned of phenolic resin hardeners are resols, formaldehyde/phenolcarboxylic acid resins and phenolic resin precursors, of which commercially available etherified and water-dilutable phenolic resin resols are preferred.

Surface coating compositions containing the amino and/or phenolic resin can be applied to a substrate by conventional methods, such as spreading, spraying, dipping and roller-coating. Provided hardeners for cold hardening are not being used the surface coatings are hardened by heating to 100° to 250° C. for a period adequate for complete hardening, in general about five minutes to about an hour.

Customary auxiliaries, for example flow-promoting agents, defoamers and/or wetting agents, can be added to dispersions according to the invention before processing.

In the following experiments and examples, % denotes in each case percent by weight. In the examples, the viscosity was always measured at room temperature using the Brookfield viscometer, rotor 2/12 R. R denotes revolutions.

PREPARATION OF DISPERSANTS

In all cases, A to I, the reaction mixture was heated to 130° C. after the $BF_3$ compound has been added, and this temperature was maintained until the reaction had terminated, indicated by an increase in the epoxide equivalent weight to the value indicated in each case.

(A) 150 g of polyethylene glycol having an average molecula weight of 3,000 and 18.5 g of a polyglycidyl ether based on bisphenol A and having an epoxide equivalent weight of 185 were heated together to 100° C., and 0.9 g of $BF_3$ etherate diluted to 5% with dioxane was added with stirring. The equivalent ratio of OH-/epoxide was 1:1. The epoxide equivalent weight was 360,000.

(B) 200 g of polyethylene glycol having an average molecular weight of 4,000 and 18.5 g of a polyglycidyl ether based on bisphenol A and having an epoxide equivalent weight of 185 were heated together to 100° C., and 0.9 g of $BF_3$ etherate was added with stirring. Equivalent ratio of OH/epoxide: 1:1. Epoxide equivalent weight: 70,000.

(C) 200 g of polyethylene glycol having an average molecular weight of 4,000 and 18.5 g of a polyglycidyl ether based on bisphenol A and having an epoxide equivalent weight of 185 were heated together to 100° C., and 0.9 g of $BF_3$ etherate diluted to 5% with diethyl ether was added with stirring. Equivalent ratio of OH-/epoxide: 1:1. Epoxide equivalent weight 200,000.

(D) 200 g of polyethylene glycol having an average molecular weight of 4,000 to 23.0 g of a polyglycidyl ether based on bisphenol A and having an epoxide equivalent weight of 185 were heated together to 100° C., and 0.9 g of $BF_3$ etherate diluted to 5% with dioxane was added with stirring. Equivalent ratio of OH/epoxide; 1:1.25. Epoxide equivalent weight 250,000.

(E) 200 g of polyethylene glycol having an average molecular weight of 4,000 and 14.0 g of a polyglycidyl ether based on bisphenol A and having an epoxide equivalent weight of 185 were heated together to 100° C., and 0.9 g of $BF_3$ etherate diluted to 5% with dioxane was added with stirring. Equivalent ratio of OH/epoxide: 1:0.75. Epoxide equivalent weight 270,000.

(F) 200 g of polyethylene glycol having an average molecular weight of 4,000 and 18.5 g of a polyglycidyl ether based on bisphenol A and having an epoxide equivalent weight of 185 were heated together to 100° C., and 1.2 g of $BF_3$ acetic acid diluted to 5% with ethylene glycol monoethyl ether were added with stirring. Equivalent ratio of OH/epoxide: 1:1. Epoxide equivalent weight 150,000.

(G) 300 g of polyethylene glycol having an average molecular weight of 6,000 and 18.5 g of a polyglycidyl ether based on bisphenol A and having an epoxide equivalent weight of 185 were heated together to 100° C., and 1,2 of $BF_3$ etherate diluted to 5% with dioxane were added with stirring. Equivalent ratio of OH/epoxide: 1:1. Epoxide equivalent weight 170,000.

(H) 200 g of polyethylene glycol having an average molecular weight of 4,000 and 25.0 g of a polyglycidyl ether based on bisphenol A and having an epoxide equivalent weight of 250 were heated together to 100° C., and 1.2 g of $BF_3$ etherate diluted to 5% with dioxane were added with stirring. Equivalent ratio of OH/epoxide: 1:1. Epoxide equivalent weight 180,000.

(I) 200 g of polyethylene glycol having an average molecular weight of 4,000 and 45.0 g of a polyglycidyl ether based on bisphenol A and having an epoxide equivalent weight of 450 were heated together to 100° C., and 2.0 g of BF₃ etherate diluted to 5% with dioxane were added with stirring. Equivalent ratio of OH/epoxide: 1:1. Epoxide equivalent weight 230,000.

EXAMPLES OF PREPARING THE DISPERSION (1) In a 2 liter three-necked flask equipped with a thermometer and blade stirrer, 557 g of a polyglycidyl ether based on bisphenol A and having an epoxide equivalent weight of 470 were dissolved, at about 120° C., in 35 g of n-butanol and 104 g of toluene. A solution of 45 g of dispersant C in 140 g of deionized water was added to the solution when it had cooled to 40° C. The mixture was dispersed with vigorous stirring at about 800 r.p.m., a highly viscous oil-in-water dispersion being formed. This dispersion was further diluted with 800 g of deionized water. After an anti-foam agent, for example based on silicone, had been added, the dispersion was concentrated under a pressure of about 27 mbar and at a temperature of at most 45° C. to a solids content of 54%. A largely solvent-free dispersion was obtained which had a particle size of about 0.7 μm and a viscosity of 180 mPa.s.

(2) Example 1 was repeated, except that 740 g of deionized water were added for dilution. The vacuum distillation was omitted. A dispersion was obtained which had a particle size of 0.65 μm and a solids content of 41% and which contained 9.5% of solvent. Viscosity: about 50 mPa.s.

(3) Example 1 was repeated, except that the dispersing was effected at 40° C. by means of a dissolver by stirring for 5 minutes at 3,000 r.p.m. The dilution with the amount of water was then carried out at lower speed of rotation. A largely solvent-free dispersion was obtained which had a particle size of about 0.45 μm and a viscosity of 120 mPa.s.

(4) Example 1 was repeated, except that the dispersing was carried out using 40 g of dispersant C. A largely solvent-free dispersion was obtained which had a particle size of 0.8 μm and a viscosity of 190 mPa.s.

(5) Example 1 was repeated, except that the dispersing was carried out using 56 g of dispersant C. A largely solvent-free dispersion was obtained which had a particle size of 0.7 μm and a viscosity of 210 mPa.s.

(6) In a 2 liter three-necked flask equipped with a thermometer and blade stirrer, 557 g of a polyglycidyl ether based on bisphenol A and having an epoxide equivalent weight of 470 were dissolved, at about 120° C. in 35 g of isobutanol and 104 g of toluene. 45 g of dispersant B were then dissolved in the solution. 940 g of deionized water were added with vigorous stirring, at about 800 r.p.m., in portions of 10% of the amount each to the solution when it had cooled to 40° C. The mixture was stirred for 10 minutes after each addition. Once an oil in water dispersion was established, which is the case after about 50% of the amount of water, the remaining amount of water was added in one portion.

After an anti-foam agent, for example based on silicone, had been added, the dispersion was concentrated under a pressure of about 26.6 mbar and at a temperature of at most 45° C. to a solids content of 54%. A largely solvent-free dispersion was obtained which had a particle size of about 0.75 μm and a viscosity of 190 mPa.s.

(7) Example 6 was repeated, except that 740 g of deionized water were added for dilution. The vacuum distillation was omitted. A dispersion was obtained which had a particle size of 0.80 μm and a solids content of 41% and which contained 9.5% of solvent. Viscosity: about 50 mPa.s.

(8) Example 6 was repeated, except that 577 g of a polyglycidyl ether based on bisphenol A and having an epoxide equivalent weight of 400 were used. A largely solvent-free dispersion was obtained which had a solids content of 54%, a particle size of about 0.70 μm and a viscosity of 180 mPa.s.

(9) Example 6 was repeated, except that 557 g of a polyglycidyl ether based on bisphenol A and having an epoxide equivalent weight of 560 were used. A lagely solvent-free dispersion was obtained which had a solids content of 54%, a particle size of about 0.75 μm and a viscosity of 170 mPa.s.

(10) Example 1 was repeated, except that 557 g of a polyglycidyl ether based on bisphenol A and having an epoxide equivalent weight of 900 were used. The dispersing was carried out at 40° C. by means of a dissolver by stirring at 3,000 r.p.m. for 5 minutes. The dilution with the amount of water was then carried out at a lower speed of rotation. A largely solvent-free dispersion was obtained which had a particle size of about 0.40 μm and a viscosity of 150 mPa.s.

EXAMPLES OF USING THE DISPERSION

(11) A dispersion was prepared in accordance with example 1 of the present invention, and concentrated under reduced pressure to a solids content of 58%. 30 g of toluene, 12 g of isobutanol, 5 g of a water-miscible silicone oil and 0.25 g of a flow-promoting auxiliary agent were added to 1,000 g of this dispersion. 187 g each of this mixture were thoroughly mixed with the following amounts of amine hardener:

(A) 12.2 g of a polyoxypropoylenediamine having a mean molecular weight of 230.

(B) 38 g of an amine hardener prepared in accordance with example 1 of German Auslegeschrift No. 2,332,177.

(C) 50 g of an amine hardener prepared in accordance with example 3A to C of European Patent Application No. 605.

The mixtures were applied in each case as 90 and 200 μm thick wet films to glass plates, sandpapered sheet iron and asbestos cement boards. The films hardened within 2 to 3 hours to give clear, hard and xylene-resistant surface coatings. Hardness, elasticity and chemical resistance were improved still further by heat-treating the surface coatings at 50° to 100° C. for 30 to 60 minutes.

(12) TO (14)

100 g each of a dispersion which had been prepared in accordance with example 3 and concentrated to a solids content of 58% were thoroughly mixed with 8 g of hexamethoxymethylmelamine (example 12) or 16 g of a water-soluble phenolic resin (resol) (example 13) or with 6.3 g of butanetetracarboxylic acid diluted with H₂O to give a 20% strength solution (example 14). 0.3 g of a water-soluble silicon oil, which was diluted 1:1 with water, was added in each case as an auxiliary to improve film formation. The hardening was in each case accelerated by adding 0.1 g of p-toluenesulfonic acid, 40% dissolved in water. In each case, the mixture was diluted with deionized water to a solids content of 45%. The dispersion was applied to degreased sheet aluminum as a film which had a thickness such that baking at 200° C. for 10 minutes produced a 6 μm thick dry film.

Surface coatings were obtained which had excellent mechanical properties and chemical resistance.

I claim:

1. A low-solvent, stable, aqueous dispersion containing as essential ingredients
    (a) 35 to 65% by weight of an epoxide resin having a mean epoxide equivalent weight in the range from 250 to 5,000,
    (b) 2 to 20% by weight of a non-ionic dispersant comprising condensation products of
        ($b_1$) polyalkylene glycols having molecular weights of 200 to 20,000 with
        ($b_2$) polyglycidyl ethers of polyhydric phenols having an epoxide equivalent weight of 100 to 2,000 in an equivalent ratio of OH to epoxide groups of 1:(0.85 to 1.5),
    (c) 0.2 to 20% by weight of organic solvent having a boiling point below 160° C. and
    (d) 35 to 60% by weight of water,
the proportions always totalling 100% by weight, the particle size being on average less than 1 $\mu$m and the total solids content of the dispersion being 10 to 80% by weight.

2. A dispersion as claimed in claim 1, wherein the epoxide resin (a) or the polyglycidyl ether component of the dispersant (b) is a diphenylolpropane-based polyglycidyl ether.

3. A dispersion as claimed in claim 1, wherein the non-ionic dispersant (b) is a condensation product of polyalkylene glycols having molecular weight of 2,000 to 10,000 and polyglycidyl ethers of polyhydric phenols having epoxide equivalent weights of 150 to 450.

4. A dispersion as claimed in claim 1, wherein the equivalent ratio of OH to epoxide groups is in the range from 1:(1 to 1.25).

5. A dispersion as claimed in claim 1, wherein dispersant (b) is present in an amount of 7–15% by weight.

6. A dispersion as claimed in claim 1, which is in the form of a dispersion within the narrower meaning of the word and contains 0.2 to 5% by weight of solvent (c).

7. A dispersion as claimed in claim 1, which is in the form of an emulsion and contains 5 to 20% by weight of solvent (c).

8. A dispersion as claimed in claim 1, wherein the total solids content is in the range from 30 to 60% by weight.

9. A process for preparing a low-solvent, stable, aqueous dispersion of an epoxide resin which comprises dispersing a 40 to 95% by weight solution of
    (a) an epoxide resin having a mean epoxide equivalent weight in the range from 250 to 5,000 in an organic solvent together with a 10 to 90% by weight aqueous solution of
    (b) a non-ionic dispersant comprising condensation products of
        ($b_1$) polyalkylene glycols having molecular weights of 200 to 20,000 with
        ($b_2$) polyglycidyl ethers of polyhydric phenols having an epoxide equivalent weight of 100 to 2,000 in an equivalent ratio of OH to epoxide groups of 1:(0.85 to 1.5),
to give a finely divided oil-in-water dispersion which is then diluted with further water to a solids content of 10 to 80% by weight, the content of the solid epoxide resin in the dispersion being in the range from 35 to 65% by weight, that of the dispersant (b), relative to the solid epoxide resin (a), being in the range from 2 to 20% by weight, that of the organic solvent (c) having a boiling point below 160° C. being in the range from 0.2 to 20% by weight and that of water being in the range from 35 to 605 by weight, the proportions always totalling 100% by weight, the particle size being on average less than 1 $\mu$m and the total solids content of the dispersion being 10 to 80% by weight.

10. A process as claimed in claim 9, wherein all or part of the solvent is removed by distillation under reduced pressure of 13 to 133 mbar and at a temperature of at most 50° C.

11. A process as claimed in claim 9, wherein a 60 to 90% solution of the epoxide resin (a) and a 20 to 40% aqueous solution of dispersant (b) are used.

12. A process as claimed in claim 9, wherein the final dispersion has a solids content in the range from 30 to 60%.

13. Shaped articles prepared from a dispersion as claimed in claim 1 in combination with a hardener.

14. A shaped article as claimed in claim 13 in which the hardener is an amine hardener or a water-soluble polycarboxylic acid.

15. A shaped article as claimed in claim 14 which is an amine hardener and used in an equivalent ratio of epoxide equivalent to amine hydrogen equivalent in the range from 1:(0.75 to 1.5).

16. An article as claimed in claim 14 wherein the hardener is an amine hardener selected from the group consisting of polyoxypropylene amines having a molecular weight in the range from 190 to 2,000, polyglycidyl ether amine adducts and polyamido amines.

17. An article as claimed in claim 13 which is in the form of a surface coating.

18. An article as claimed in claim 13 wherein the dispersion is used also in combination with 5 to 50% by weight of an amine resin or a phenolic resin or a combination of both or a combination of anyone thereof with further condensation, polymerization and/or addition results.

19. An article as claimed in claim 18 wherein as the amine or phenolic resin or the combination thereof an etherified resin is used.

* * * * *